United States Patent [19]

Lorince

[11] Patent Number: 4,510,689
[45] Date of Patent: Apr. 16, 1985

[54] SIDE TRIMMER KNIFE

[75] Inventor: Julius Lorince, Crete, Ill.

[73] Assignee: Modern Machine and Grinding, Inc., Dyer, Ind.

[21] Appl. No.: 507,280

[22] Filed: Jun. 23, 1983

[51] Int. Cl.³ .............................................. B26B 25/00
[52] U.S. Cl. ................................... 30/347; 76/101 A; 83/500; 29/402.04
[58] Field of Search ................. 83/329, 331, 500, 502, 83/503, 504; 30/347; 76/101 A, DIG. 6; 29/402.01, 402.03, 402.04

[56] References Cited

U.S. PATENT DOCUMENTS

| | | | |
|---|---|---|---|
| 1,422,901 | 7/1922 | Terry | 83/500 X |
| 1,749,596 | 3/1930 | McArdle | 76/DIG. 6 |
| 4,414,875 | 11/1983 | Pearson | 83/504 |

Primary Examiner—Jimmy C. Peters
Attorney, Agent, or Firm—Wood, Dalton, Phillips, Mason, & Rowe

[57] ABSTRACT

A side trimmer knife having a cylindrical body with a pair of exposed faces and a cutting edge at the periphery of at least one face, with the body being defined by a pair of juxtaposed cylindrical disks of hardened steel. The disks are held in rigidly aligned relation by a plurality of cap screws extended through aligned openings in each of the disks, with the openings tapering outwardly toward an exposed face of the knife body. The head and nut for each cap screw are also tapered to fit in the tapered openings to forcibly draw the disks toward each other and maintain their lock with the disks after repeated grinding of the faces of the body for the purpose of renewing the peripheral cutting edge.

8 Claims, 3 Drawing Figures

U.S. Patent  Apr. 16, 1985  4,510,689
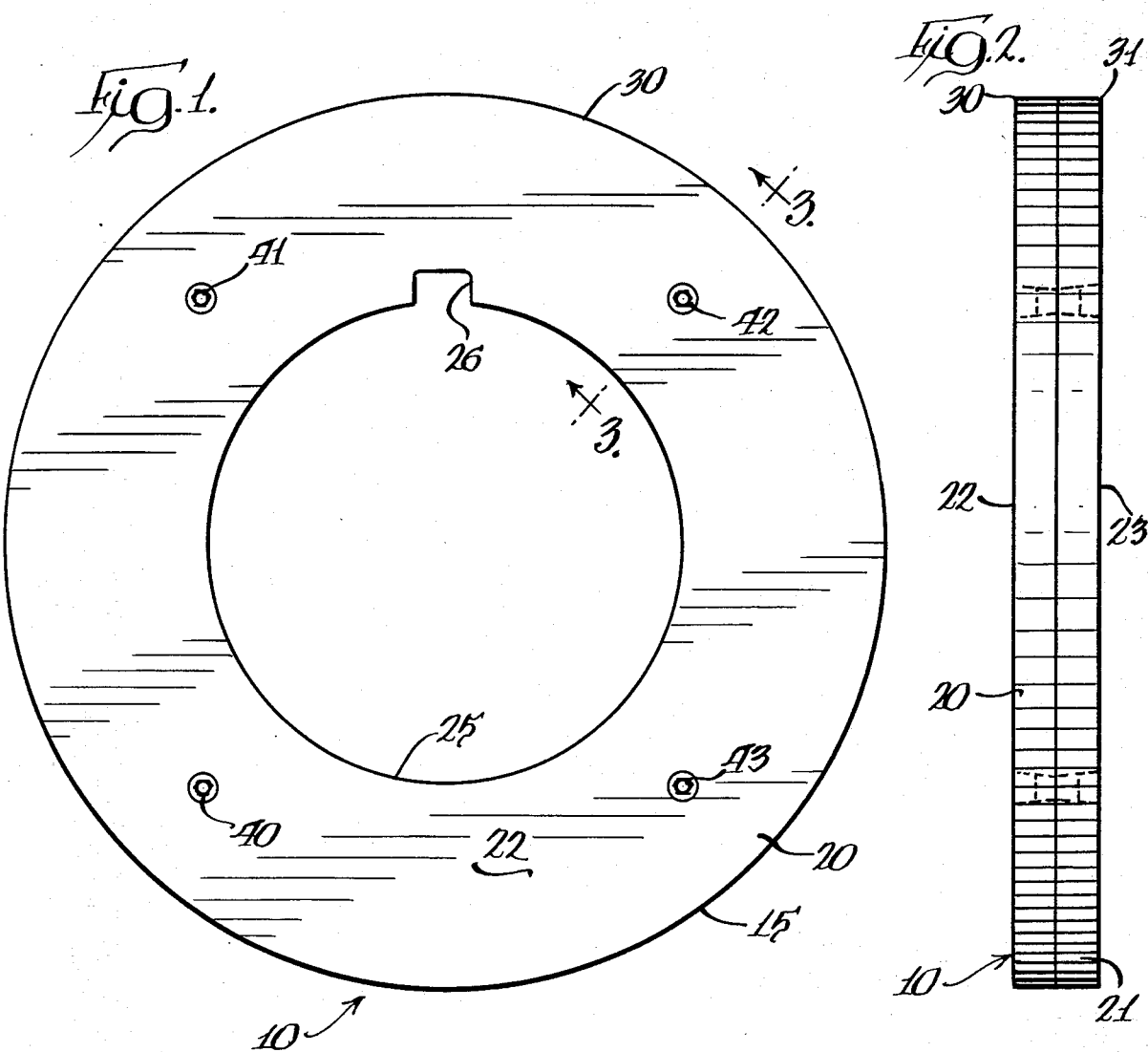
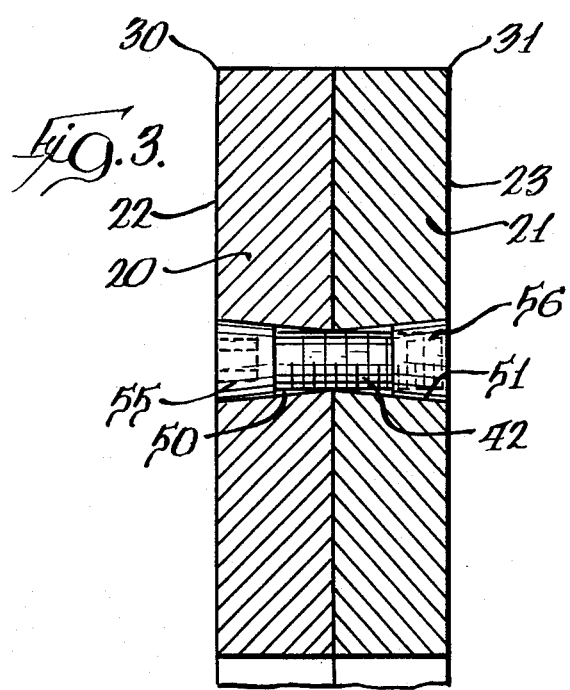

SIDE TRIMMER KNIFE

BACKGROUND OF THE INVENTION

This invention pertains to a side trimmer knife which is formed from two used knife sections which have been reduced in thickness through repeated grinding to renew a peripheral cutting edge thereof and which are assembled to form a new knife and mechanically held together by means which functions to hold the knife sections together during repeated grindings of the faces of the newly-formed knife for repeated renewal of the peripheral cutting edges.

In a steel mill, the edges of strip steel are trimmed by a pair of side trimmer knives, each having a peripheral cutting edge which, during rotation thereof, cut the edges of the strip steel to form a strip of uniform width. Typically, a side trimmer knife is formed of a cylindrical body of hardened steel to have two peripheral cutting edges extending around the periphery of the exposed faces of the body, whereby, as one cutting edge becomes dull, the knife can be reversed on the arbor to bring the other cutting edge into use. After both cutting edges are worn, the knife is removed from the arbor and both exposed faces are ground to renew the sharpness of the peripheral cutting edges. A new cutting knife normally has a thickness of approximately 1.5 inches and, after repeated grindings have reduced the width thereof to approximately one-half the initial width, the knife does not have sufficient strength for continued cutting and the knife is scrapped.

SUMMARY OF THE INVENTION

A primary feature of the invention disclosed herein is to utilize side trimmer knife sections which would otherwise be scrapped to form a new side trimmer knife. A pair of the used knife sections are mechanically locked together to have adequate strength for cutting and adequate width for repeated grinding on the exposed faces thereof to renew the peripheral cutting edges while maintaining the two scrap sections in fixed relation to each other.

An object of the invention is to provide a side trimmer knife having a body with at least one peripheral cutting edge comprising two juxtaposed cylindrical disks, defined by used knife sections, with aligned openings therein and threaded means in the openings for locking the disks together and maintaining the disks in locked relation after repeated grinding of said body to renew the peripheral cutting edge.

Another object of the invention is to provide a side trimmer knife having a cylindrical body with a pair of exposed faces and at least one cutting edge at the periphery of an exposed face, said body being defined by a pair of juxtaposed cylindrical disks of hardened steel with aligned openings in said pair of disks and each opening having an outer portion tapering toward an exposed face of the body, and means for locking the disks together and maintaining said locked relation after one or more grinding operations on a face of the body to renew the cutting edge comprising a threaded member in each pair of aligned openings, with a first member in one opening tapered to fit the opening and connected to the threaded member and a second member connected to the threaded member and positioned in the other opening of the aligned pair of openings and having a taper to fit said other opening.

Still another object of the invention is to provide a side trimmer knife having a cylindrical body with a pair of exposed faces and a cutting edge at the periphery of each face, said body being defined by a pair of juxtaposed cylindrical disks of hardened steel, a plurality of aligned openings in said pair of disks which taper outwardly toward an exposed face of the body, and means for locking said disks together and maintaining said locked relation after a plurality of grinding operations on said faces to renew said cutting edges comprising a cap screw in each pair of aligned openings with a head in one opening tapered to fit said one opening and a nut threaded on the cap screw and positioned in the other opening of the aligned pair of openings and having a taper to fit said other opening.

BRIEF DESCRIPTION OF THE DRAWING

FIG. 1 is a side elevational view of the side trimmer knife;

FIG. 2 is an end elevational view thereof; and

FIG. 3 is a sectional view, on an enlarged scale taken generally along the line 3—3 in FIG. 1.

DESCRIPTION OF THE PREFERRED EMBODIMENT

The side trimmer knife is indicated generally at 10 in FIGS. 1 and 2 and has a cylindrical body 15 defined by a pair of juxtaposed cylindrical disks 20 and 21 of hardened steel with exposed faces 22 and 23, respectively. The disks 20 and 21 are used knife sections which would normally be scrapped. The cylindrical body has a central opening 25 for mounting of the knife on an arbor and with a keyway 26 provided for coaction with a key on the arbor. The opening and the keyway exist in the scrap knife sections.

The side trimmer knife 10 has a pair of peripheral cutting edges 30 and 31 at the outer periphery of the exposed faces 22 and 23 of the cylindrical disks 20 and 21, respectively.

In a commercial construction, the width of the side trimmer knife 10 is approximately 1.5 inches, with each of the disks 20 and 21 having a width equal to approximately one-half the total width. The disks 20 and 21, as previously mentioned, are scrap sections of previously-used side trimmer knives which, through repeated grindings to renew the peripheral cutting edges thereof, have been reduced in width to a dimension which is not adequate to provide sufficient strength for the cutting action. The side trimmer knife disclosed herein utilizes two of the scrap knife sections identified herein as the cylindrical disks 20 and 21 to form a new side trimmer knife having adequate strength for proper cutting and sufficient width to permit repeated grindings of the exposed faces thereof to renew the peripheral cutting edges 30 and 31.

The cylindrical disks 20 and 21 are structurally locked together by mechanical means. This locking structure includes a plurality of cap screws 40–43 which extend through aligned openings machined in the juxtaposed cylindrical disks. The structure and mounting of each of the cap screws is the same and the structure is shown in detail in FIG. 3 for the cap screw 42.

The cylindrical disks 20 and 21 each have a machined opening 50 and 51, respectively, to define a pair of aligned openings through which the cap screw extends. Each of the openings 50 and 51 tapers outwardly toward the exposed face of the disk in which the opening is formed. A head 55 of the cap screw has a taper matching that of the opening 50 to tightly fit therein, while a nut 56, threadably connected to the cap screw, has a corresponding taper to match and tightly fit in the opening 51.

In assembling the cylindrical disks 20 and 21, a bonding agent, such as ZIP-GRIP 10, manufactured by Devcon, is placed between the disks 20 and 21 and then the disks are tightly drawn together by tightening the nuts 56 on the cap screws. To assist in locking the nut on the cap screw, the same bonding agent can be applied between the threads of the cap screw and the nut. This bonding agent is only one example of a suitable material which is not adversely affected by heat.

Although the taper of the openings 50 and 51 and of the head 55 and nut 56 of the cap screw may vary within fairly wide limits so long as the opening taper matches that of the head and nut, in a commercial embodiment, the taper is 5°. This taper acts to exert a force to tightly draw the disks 20 and 21 together. An added important feature is that, as the exposed faces 22 and 23 of the disks 20 and 21 are ground and thus the thickness of the cylindrical body is reduced, the mechanical lock is maintained. The grinding will grind off some of the head and nut of the cap screw. However, so long as a part of each remains, the cylindrical disks are mechanically locked together because of the taper action between the openings and that part of the head and nut which remains.

From the foregoing, it will be evident that the side trimmer knife has a body defined by a pair of juxtaposed cylindrical disks 20 and 21 of hardened steel having a plurality of aligned openings 50 and 51 in the pair of disks with at least an outer portion of each opening tapering outwardly toward an exposed face of the body. Additionally, means are provided for locking the disks together and maintaining the locked relation after one or more grinding operations on at least one face of the body to renew a cutting edge at the periphery comprising a threaded member in the form of the cap screw 42 fitted in a pair of aligned openings with the head 55 thereof defining a first member which is tapered to fit in the opening 50 and connected to the threaded member and the nut 56 defines a second member which is connected to the threaded member 42 and positioned in the opening 51 and having a taper to fit in the opening 51. The members function to draw the disks tightly together and maintain them in a rigid structural relation providing sufficient strength for cutting and which maintain this relation during repeated grinding of the faces of the knife to renew the peripheral cutting edges 30, 31.

I claim:

1. A side trimmer knife having a body with a pair of opposite exposed faces comprising, two juxtaposed cylindrical disks each having one of said faces, a cutting edge defined by the periphery of at least one of said faces, aligned openings in said disks, and threaded means in said openings for locking said disks together and maintaining said disks in locked relation after repeated grinding of a body face, to renew the peripheral cutting edge.

2. A knife as defined in claim 1 wherein said threaded means includes a threaded member and means within said openings interconnecting the threaded member to each of said disks.

3. A knife as defined in claim 2 wherein said openings are tapered to progressively increase the diameter of the opening toward an exposed face of the disk, and said means within the openings are connected to the threaded member and have a taper corresponding to that of the openings.

4. A side trimmer knife having a cylindrical body with a pair of exposed faces and a cutting edge at the periphery of each face, said body being defined by a pair of juxtaposed cylindrical disks of hardened steel, a plurality of aligned openings in said pair of disks which taper outwardly toward an exposed face of the body, and means for locking said disks together and maintaining said locked relation after a plurality of grinding operations on said faces to renew said cutting edges comprising a cap screw in each pair of aligned openings with a head in one opening tapered to fit said one opening and a nut threaded on the cap screw and positioned in the other opening of the aligned pair of openings and having a taper to fit said other opening.

5. A knife as defined in claim 4 including a bonding material between said disks.

6. A knife as defined in claim 4 in which bonding material secures said nut to said cap screw.

7. A side trimmer knife having a cylindrical body with a pair of exposed faces and at least one cutting edge at the periphery of an exposed face, said body being defined by a pair of juxtaposed cylindrical disks of hardened steel, a plurality of aligned openings in said pair of disks with at least an outer portion of each opening tapering outwardly toward an exposed face of the body, and means for locking said disks together and maintaining said locked relation after one or more grinding operations on a face of the body to renew said cutting edge comprising a threaded member in each pair of aligned openings with a first member in one opening tapered to fit said one opening and connected to the threaded member and a second member connected to the threaded member and positioned in the other opening of the aligned pair of openings and having a taper to fit said other opening.

8. A side trimmer knife having a cylindrical body with a pair of exposed faces and an integral cutting edge at the periphery of at least one face, said body being defined by a pair of juxtaposed cylindrical disks of hardened steel, a plurality of aligned openings in said pair of disks and means for locking said disks together comprising, a plurality of shaped aligned openings in said pair of disks, elongate retention members positioned one in each of said pair of aligned openings, and pairs of headed members connected one to each end of said elongate retention members and which are shaped and positioned to coact with the shape of said aligned openings to retain said disks in lock relation after a plurality of grinding operations on one or both of said exposed faces and for renewal of one or both of said cutting edges which reduce the thickness of said body.

* * * * *